A. SMITH.
Combined Shovel Plows and Cultivators.

No. 142,655.                              Patented September 9, 1873.

Witnesses.                                Inventor.
Charles Huber.                            Albert Smith
R. M. Monroe                              per O. Stauffer

UNITED STATES PATENT OFFICE.

ALBERT SMITH, OF PROVIDENCE TOWNSHIP, PENNSYLVANIA.

IMPROVEMENT IN COMBINED SHOVEL-PLOWS AND CULTIVATORS.

Specification forming part of Letters Patent No. 142,655, dated September 9, 1873; application filed March 17, 1873.

*To all whom it may concern:*

Be it known that I, ALBERT SMITH, of Providence township, near Smithville Post-Office, in the county of Lancaster and State of Pennsylvania, have invented certain Improvements in a Combined Shovel-Plow and Cultivator, of which the following is a specification:

The object of my invention is the construction of a strong and simple one-horse shovel-plow, and to be readily converted into a cultivator by means of adjustable side beams and shovels by simply hooking on or off, and is admirably adapted for working corn or tobacco in the field.

The accompanying drawing illustrates the construction and arrangement of the parts, in which—

Figure 1:
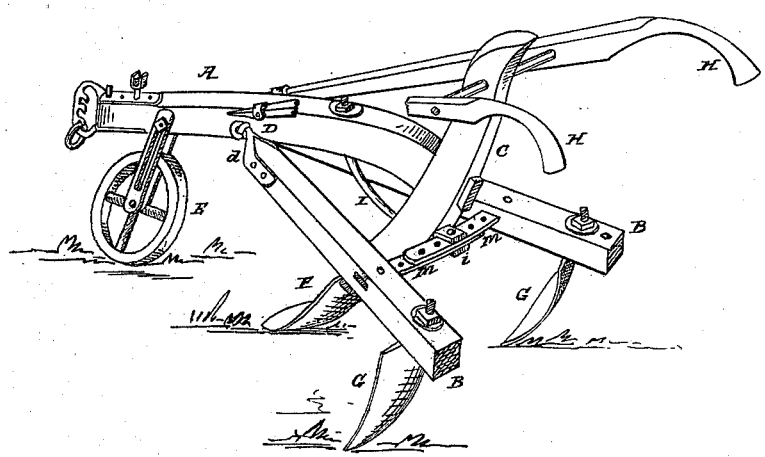
Figure 2:
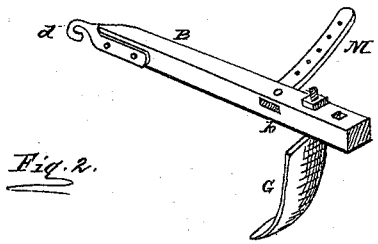

Figure 1 is a perspective view of all the parts combined; Fig. 2, one of the detached side beams, with its hook, shovel, and adjusting segment affixed, forming one piece or portion united.

The center or permanent beam A is supported in front by an ordinary pulley-wheel, E, and mortised into the shovel-support C. There is a brace-rod, I, bolted to the main beam A, passing through the shovel-support C, with its end produced into an open slot or jaws, *i*, perforated for a bolt. The handles H are attached to the main or center beam in the usual manner, and stayed by a cross-piece from one to the other through the shovel-support C. The broad-pointed shovel F is bolted to the same.

Thus far no special novelty is claimed, except the jawed brace I and the side eyebolts D, under the attachment of the handles. The side beams B are each provided with a shovel, G, and segmental arm, M, and terminal hook *d*. These segments M are slightly curved and perforated for the connecting-bolt, entering through the jaws *i* and the overlapping adjustable segments to hold them in place, while the hook *d*, being first passed through the eye of the bolt or plate D, and thereby connected to the central beam, forms an excellent cultivator.

The plate *b* beneath the beams B, through which the shovel-neck enters, may be extended for a perforation to adjust the said shovels in them to set in an oblique direction in order to throw the soil outward instead of inward, as in the position shown, as may be desirable for certain purposes.

The construction of the center beam and standard with its single-shovel plow constitutes a superior implement for drawing a furrow or for ditching and draining purposes, being strong and compact, in combination with the brace and terminal bearing for the adjusting-arms, the ease by which it can be converted into a most efficient cultivator by simply attaching on each side, by means of a hook, the side beams, each provided with a single narrow shovel and adjusting-arm, altogether resulting in producing a highly useful and desirable machine on the farm.

What I claim as my invention, and desire to secure by Letters Patent, is—

A cultivator with main center beam and standard, carrying a main shovel, with two side beams, each carrying a smaller shovel, the side beams adjustable in width, as shown, and attached in front, so as to be removed by unhooking alone, making a complete single-shovel plow, the whole constructed and arranged as shown and described.

ALBERT SMITH.

Witnesses:
 W. B. WILEY,
 JACOB STAUFFER.